United States Patent

Bonnet

Patent Number: 5,979,633
Date of Patent: Nov. 9, 1999

[54] CONVEYOR HAVING HIGH SPEED DISCHARGE CAPABILITIES

[75] Inventor: Henri Bonnet, Atlanta, Ga.

[73] Assignee: United Parcel Service of America Inc., Atlanta, Ga.

[21] Appl. No.: 08/845,605

[22] Filed: Apr. 25, 1997

[51] Int. Cl.⁶ .................................................. B65G 15/60
[52] U.S. Cl. ..................... 198/370.09; 198/847
[58] Field of Search ..................... 198/360, 361, 198/367, 369.1, 370.04, 370.07, 370.09, 370.01, 846, 847

[56] References Cited

U.S. PATENT DOCUMENTS

| | | | |
|---|---|---|---|
| 981,312 | 1/1911 | Robins | 198/847 |
| 1,462,511 | 7/1923 | Lister . | |
| 1,549,499 | 8/1925 | Parker . | |
| 1,781,750 | 11/1930 | Dodge et al. . | |
| 2,895,593 | 7/1959 | McKnight et al. . | |
| 3,138,238 | 6/1964 | Good et al. . | |
| 3,204,753 | 9/1965 | Moseley . | |
| 3,312,330 | 4/1967 | Juengel | 198/370.09 |
| 3,768,624 | 10/1973 | Kornylak . | |
| 3,857,478 | 12/1974 | Meeusen . | |
| 3,861,514 | 1/1975 | Ling . | |
| 4,555,010 | 11/1985 | Solund | 198/370.09 |
| 4,598,815 | 7/1986 | Adama . | |
| 4,752,175 | 6/1988 | Lichti . | |
| 5,477,955 | 12/1995 | Madden et al. . | |

FOREIGN PATENT DOCUMENTS

| | | |
|---|---|---|
| 0 287 171 | 10/1988 | European Pat. Off. . |
| 2 407 149 | 5/1979 | France . |
| 12 21 970 | 7/1966 | Germany . |
| 2 210 841 | 6/1989 | United Kingdom . |

Primary Examiner—Christopher P. Ellis
Assistant Examiner—Gregory A. Morse
Attorney, Agent, or Firm—Jones & Askew, LLP

[57] ABSTRACT

An automated conveyor sortation and item discharge system for conveying and discharging packages at high speeds. A conveyor assembly includes an elongate crowned conveyor belt which conveys parcels in a longitudinal direction defined across slider beds and across discharge stations. The parcels can take three different routes once they reach the discharge stations. They may be allowed to pass the discharge stations and continue to be conveyed by the crowned conveyor belt, or they can be selectively discharged off of the crowned conveyor belt and into discharge chutes located to either side of the substantially straight path of the crowned conveyor belt. Each of the discharge stations includes a selectively indexable fork member supporting a group of idling rollers. The parcels have sliding contact with the slider beds and "rolling contact" with the idler rollers. When a package is in the desired position, the fork member can be indexed to cause some of the rollers to move upwardly and inwardly. This causes the package to tilt about the top of the crowned conveyor belt until the package contacts a withdrawal roller opposing the conveyor belt from the raised rollers. The withdrawal roller draws the into one of two chutes for sorting purposes.

27 Claims, 3 Drawing Sheets

CONVEYOR HAVING HIGH SPEED DISCHARGE CAPABILITIES

TECHNICAL FIELD

This invention relates generally to automated conveying and sorting of items such as packages from one or more loading sites to a variety of output destinations, and more particularly relates to a conveying system which can eject packages to either side of a high speed conveyor onto designated output chutes, bins or subsequent conveyors under programmed or manual control.

BACKGROUND OF THE INVENTION

Modern high volume package delivery systems often include package conveying systems that accept packages from one or more loading stations, and transport the packages to a variety of output destinations such as chutes, bins, and subsequent conveyor systems.

One of the most conventional types of conveyors is a belt conveyor, which includes the use of an endless flexible belt which passes over at least two cylindrical rollers, one of which is a drive roller. Packages are placed atop the upwardly-directed "working" surface of the belt conveyor, and are transported in a generally straight direction from end of the conveyor to the other. Another type of conveyor is a "roller" conveyor which con include powered or idling rollers which contact, support, and in certain instances propel the bottom of the package along its path.

Some conveying systems include diversion features which allow for the discharge of objects from a conveying surface at selected stations located along the path of the conveying surface. Some package diverting systems utilize a pusher element mounted relative to a conveying surface which when actuated ejects an adjacently placed package laterally across the conveyor surface to the desired discharge station. Some package diverting systems include the use of diversion elements which lie along the conveyor and provide the diversion forces against the bottom surfaces of the package.

A modular diverter shoe and slat construction disclosed in U.S. Pat. No. 5,127,510 to Cotter describes a modular diverter shoe for use in a slat conveyor. A diverter shoe is mounted to each slat so that the shoe may glide across the slat. The movement of the diverter shoe is affected by a guide pin and coaxial bearing which engages a network of guide tracks located beneath the conveying surface. When a package is to be diverted, a diverting switch is actuated to switch the guide pins for the diverter shoe adjacent to the package onto a diagonal track, which causes the diverter shoe to move across the slat and eject the package.

Another apparatus for sorting objects is disclosed in U.S. Pat. No. 4,732,260 to Canziani. In that system, a conveyor belt is described in which each conveyor element has a slit. The pusher elements are slidably inserted into the slits and each pusher element is connected to a drive element that extends beneath the conveyor surface. The drive element is attached to rollers and interacts with a series of cams or guide rails located beneath the conveyor. The cams include an electro-pneumatic two-position end portion. In one position, the cam engages the drive element rollers and slides the pusher element. In a second position, the rollers do not engage the guide rails.

U.S. Pat. No. 3,768,624, which issued to Kornylak, discloses a flexible belt conveyor system. Referring to FIG. 3, a flexible endless belt 6 travels between horizontal surfaces 16 and 18. A spring 20 extends downward from an object 14 to engage a notch in the belt 6. As a result, the object 14 travels with the belt 6 and slides across the surfaces 16 and 18. In another embodiment depicted in FIGS. 1 and 2, the traveling belt 6 extends above the edges of a tube 2. A coat hanger hook 12 engages a notch (cleat 10) defined by the belt 6. As a result, the coat hanger hook 12 travels with the belt and slides upon upper portions of the tube 2 that are adjacent to the belt 6.

U.S. Pat. No. 2,895,593, which issued to McKnight et al., discloses another flexible belt conveyor. Referring to FIGS. 10 and 11, anti-friction projections 61 or 63 can be mounted at either side of the driven belt 11.

U.S. Pat. No. 3,857,487, which issued to Meeusen, discloses another flexible belt conveyor. Referring to FIG. 3, the surface of the conveyor belt includes resilient pads 4 with deformable projections 5. Articles 2 being conveyed rest upon the pads 4.

U.S. Pat. No. 1,781,750, which issued to Dodge et al., discloses a conveyor system for conveying lumber 36. As depicted in FIG. 1, the lumber 36 travels upon multiple flexible belts 12.

U.S. Pat. No. 3,138,238, which issued to De Good et al., discloses a conveyor system with a powered diverter. Referring to FIGS. 1 and 3, the De Good et al. device includes a main powered conveyor 10 and a powered side conveyor 22 extending from a side of the main conveyor 10. A traveling continuous belt 20 drives the rollers 16 (FIG. 1) of the main conveyor 10, and a drive belt 24 causes conveyance of objects upon the side conveyor 22. An object traveling in the direction defined from left to right on the main conveyor 10 is diverted to the side conveyor 22 by a powered diverter. The powered diverter includes an assembly of diverting wheels 48 (FIG. 3) that are oriented toward the side conveyor 22. The group of diverting wheels 48 are normally positioned below the tops of the rollers 16 of the main conveyor 10 so that objects traveling on the main conveyor 10 are not contacted by the diverting wheels 48. When it is desirable to divert an object from the main conveyor 10 to the side conveyor 22, the diverting rollers 48 are elevated so that they are slightly above the top surfaces of the rollers 16 of the main conveyor 10. The diverting rollers 48 are pushed upward by a device within the box 32 (FIG. 1) which pushes the belt 20 upward underneath the diverting wheels 48. The belt 20 causes the diverting wheels 48 to rotate and drive an object onto the side conveyor 22. The driven belt 24 of the side conveyor 22 draws the diverted object onto the side conveyor 22 and propels the object along the side conveyor 22.

U.S. Pat. No. 1,462,511, which issued to Lister, discloses another conveyor diverter. Referring to FIG. 1, a side conveyor 37 extends perpendicularly from a main conveyor. Referring to FIG. 8, rollers 36 of the main conveyor are perpendicular to diverting rollers 41 that divert objects from the main conveyor to the side conveyor 37 (FIG. 1). The bed of diverting rollers 41 are in a pivoted configuration in FIG. 8 such that an object (not shown) upon the diverting rollers 41 would roll under the force of gravity across the bed of diverting rollers 41 onto the side conveyor 37 (FIG. 1).

U.S. Pat. No. 5,477,955, which issued to Madden et al., discloses a tilting tray conveyor system. Referring to FIG. 2, pivotably mounted trays 60 carry objects. A leg 67 extends from each tray 60. A particular tray 60 is pivoted to discharge an object when a lever 81 pushes the leg 67 of that tray 60 upward.

Although the prior art includes some advantages, a need always exists in the art for an improved conveyor sorting system which allows for high speed travel of packages while still allowing for effective side discharge, without the need for side impact.

SUMMARY OF THE INVENTION

The present invention provides an improved conveyor sorting system which allows for high speed travel of packages while still allowing for effective side discharge, without the need for side impact.

Generally described, the invention relates to a conveying apparatus comprising a belt having an deformable surface defined by a soft urethane portion, and a slider bed positioned adjacent the deformable belt, the cushioned belt and the slider belt configured to combine to support the weight of the packages, and the cushioned belt configured to urge the package along the conveying axis.

The invention further relates to a conveying apparatus comprising a two-layer crowned deformable belt including an upper deformable crowned portion and a lower, less deformable, structural portion, and a slider belt positioned adjacent the cushioned belt, the cushioned belt and the slider belt configured to combine to support the weight of the packages, and the cushioned belt configured to urge the package along the conveying axis.

The invention further relates to a conveying apparatus comprising a conveyor belt with a crowned top, the belt including an elongate substantially straight portion, and a first and second elongate support means positioned on opposing sides of the straight portion of the belt and configured to provide support at a common plane, the belt and the support means configured to combine to support the weight of the packages, and the cushioned belt configured to urge the package along the conveying axis.

The invention further relates to a conveying apparatus for conveying a package having a substantially planar, downwardly-directed lower surface, the conveying apparatus comprising an endless belt having a portion lying along a substantially straight path having a longitudinal path axis, the belt defining an upper surface configured to contact the downwardly-directed lower surface of the package and to transport the package thereon while allowing the package to be tilted laterally thereon from an untilted neutral orientation to a tilted orientation, an ejection member configured to contact and urge the package such that the package is tilted from the neutral to the tilted orientation, and a withdrawal member positioned below the plane of and spaced from the downwardly-directed lower surface when the package is in the neutral orientation, but also positioned to be in frictional contact with a portion of the downwardly-directed lower surface when the package is in the tilted orientation, the frictional contact being sufficient to allow the withdrawal member to assist in the removal of the package from the belt, such that the package can be contacted and urged by the ejection member from the neutral to the tilted orientation and the withdrawal member can assist in the removal of the package from the belt.

The invention further relates to a conveying apparatus for conveying a package having a substantially planar lower surface, the conveying apparatus comprising an endless belt configured to transport a package along a conveying path, the endless belt having a crowned upper surface allowing the package to be tilted laterally atop the crowned surface such that the lower package surface can be in contact with said crowned surface yet can be tilted from a substantially horizontal to an inclined orientation, a withdrawal member having a frictionally engaging member configured to engage the package only when tilted laterally, and means for tilting the package laterally across the longitudinal axis of the belt such that the withdrawal member frictionally engages a portion of the lower surface of the package and tends to remove the package from atop the conveyor.

The invention further relates to a conveying apparatus for conveying a package having a substantially planar, downwardly-directed lower surface including first and second spaced-apart lower surface portions, the conveying apparatus comprising an endless belt having a portion lying along a substantially straight path having a longitudinal path axis, the belt defining an upper surface configured to contact the downwardly-directed lower surface of the package and to transport the package thereon, the belt having a width less than that of the package to allow the package to extend laterally therefrom on both sides of the belt to provide access from below to the lower surface portions of the planar lower surface and to allow the package to be tilted laterally thereon from a neutral orientation to one of two tilted orientations, the orientations being a first and a second tilted orientation, a first ejection member configured to contact and urge the first lower surface portion of the package such that the package is tilted from the neutral to the first tilted orientation, an second ejection member configured to contact and urge the second lower surface portion of the package such that the package is tilted from the neutral to the second tilted orientation, a first withdrawal member positioned below the plane of and spaced from the downwardly-directed lower surface when the package is in the neutral orientation, but also positioned to be in frictional contact with the downwardly-directed lower surface when the package is in the second orientation, the frictional contact being sufficient to allow the withdrawal member to assist in the removal of the package from the belt, a second withdrawal member positioned below the plane of and spaced from the downwardly-directed lower surface when the package is in the neutral orientation, but also positioned to be in frictional contact with the downwardly-directed lower surface when the package is in the second tilted orientation, the frictional contact being sufficient to allow the withdrawal member to assist in the removal of the package from the belt, such that the package can be contacted and urged by the first ejection member from the neutral to the first tilted orientation and the first withdrawal member can assist in the removal of the package from the belt in a first direction, and such that the package can be contacted and urged by the second ejection member from the neutral to the second tilted orientation and the second withdrawal member can assist in the removal of the package from the belt in a second direction.

The invention further relates to a conveying apparatus for conveying a package having a substantially planar, downwardly-directed lower surface including first and second spaced-apart lower surface portions, the conveying apparatus comprising an endless belt having a portion lying along a substantially straight path having an upstream and downstream portion both lying along a longitudinal path axis, the belt defining an upper surface configured to contact the downwardly-directed lower surface of the package and to transport the package thereon, the belt having a width less than that of the package to allow the package to extend laterally therefrom to provide access to the lower surface portions of the planar lower surface and to allow the package to be tilted laterally thereon from a neutral position to a first tilted position, a pair of slider beds on opposite sides of the first portion of the belt, the slider beds each defining a plurality of support portions all lying substantially in a first common plane, a discharge station having two movable support means each defining a plurality of support portions all lying substantially in a second common plane, the movable support means commonly selectively movable relative to the longitudinal axis of the belt such that the plurality of support portions can be selectively moved from a position in which the first common plane is common to the second common plane to a position in which the first common plane is at an angle to the second common plane.

Therefore, it is an object of the present invention to provide an improved automated conveyor sorting system.

It is a further object of the present invention to provide an improved ejection mechanism for ejecting items from a conveying surface.

It is a further object of the present invention to provide a conveyor which is simple in construction.

It is a further object of the present invention to provide a conveyor which is simple in operation.

It is a further object of the present invention to provide a conveyor which is cost-effective to manufacture, operate, and maintain.

It is a further object of the present invention to provide an improved conveyor which may be easily dismantled for repair and maintenance.

It is a further object of the present invention to provide an improved apparatus for conveying and sorting items that can be repaired by quickly removing failed sub-assemblies.

It is a further object of the present invention to provide a conveyor which operates at reduced noise levels.

Other objects, features, and advantages of the present invention will become apparent upon review of the following description of preferred embodiments and the appended drawings and claims.

DETAILED DESCRIPTION

Figure 1:
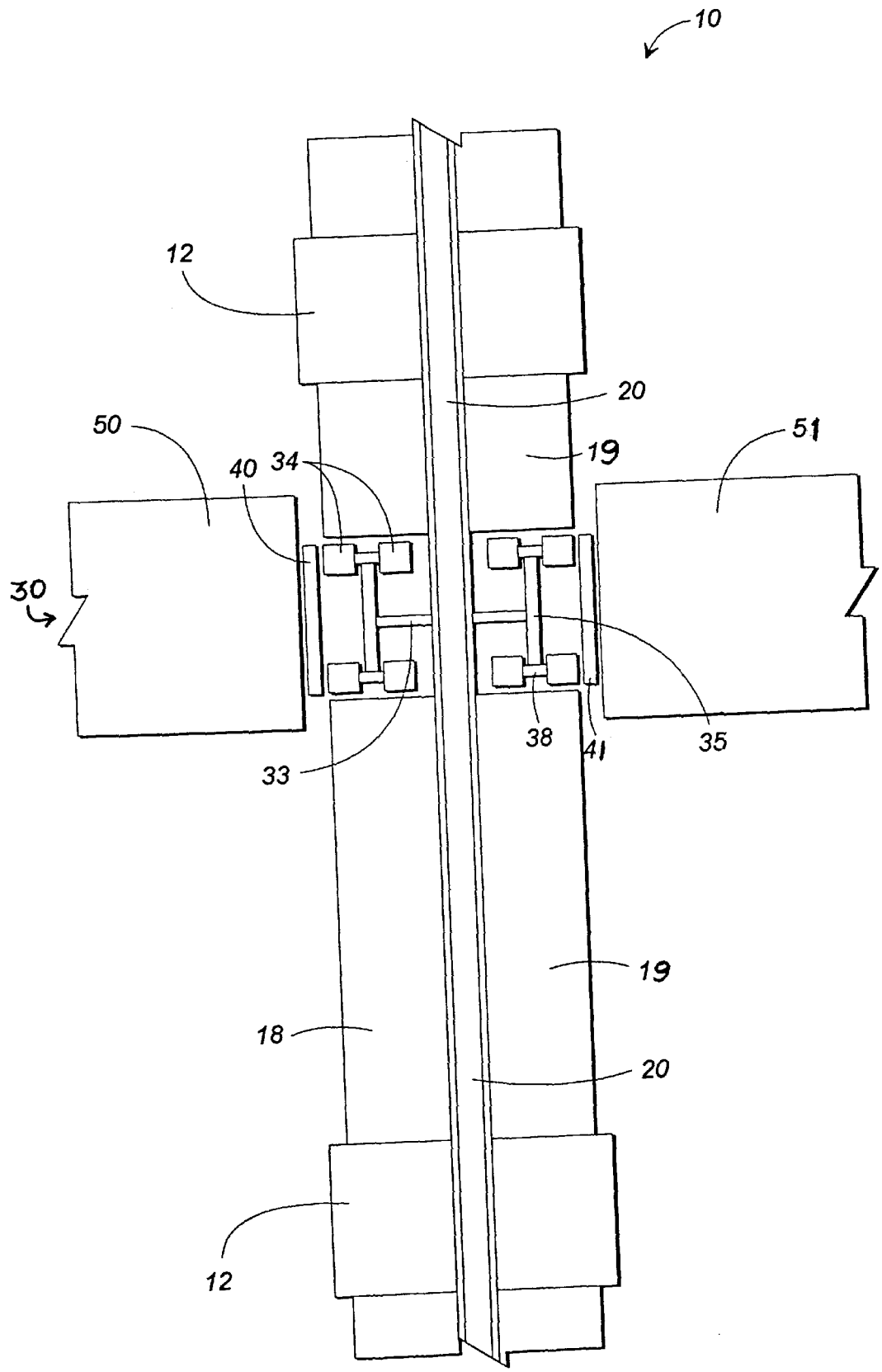
FIG. 1 is a top plan view of the conveyor assembly 10 according to the present invention, showing packages moving upwardly along the page.

Reference is now made in more detail to the drawings, in which like numerals refer to like parts throughout the several views.

General Discussion

Referring generally to FIGS. 1–6, general discussion of the operation of the conveyor apparatus 10 according to the present invention is now made.

The conveyor assembly 10 includes an elongate crowned conveyor belt 20 which conveys parcels 12 in a longitudinal direction defined across slider beds 18, 19 and across discharge stations such as 30. The parcels (which may also be referred to as "packages" 12) can take three different routes once they reach the discharge stations. They may be allowed to pass the discharge stations 30 and continue to be conveyed by the crowned conveyor belt 20, or they can be selectively discharged off of the crowned conveyor belt and into discharge chutes 50, 51 located to either side of the substantially straight path of the crowned conveyor belt 20.

Each of the discharge stations 30 includes a selectively indexable pivoting fork assembly 32 which includes a pair of upwardly-directed tines 37. A group of idling rollers 34 are mounted proximate each of the ends of the upwardly-directed tines 37.

The parcels 12 have sliding contact with the slider beds 18, 19 and "rolling contact" with the rollers 18 of the discharge section 16. When a package is in the desired position, the fork member 32 can be indexed to cause one group of rollers, which are already in contact with the bottom surface of the package, to move upwardly and inwardly. This causes the package to tilt about the top of the crowned conveyor belt 20 until the package contacts a withdrawal roller opposing the conveyor belt from the raised rollers. The withdrawal roller draws the parcels into one of two chutes 50, 51 for sorting purposes.

In the following discussion, a "primary conveying axis" will be referenced. This axis is an imaginary axis which is parallel to the travel axis of all package as they travel under the sole influence of the crowned conveyor belt 20. This axis will be assumed to be horizontal, although it could be at least slightly inclined under other applications of the present invention.

The Slider Beds

The slider beds 18, 19 are positioned on opposite ends of the discharge station 30, and each define an upwardly-directed substantially horizontal sliding surface. In the preferred embodiment the slider beds 18, 19 are slick pieces of sheet metal, or the like.

The upper surface of the crowned conveyor belt 20 extends slightly above the plane defined by the top surfaces of the slider beds 18, 19. As described in further detail later, this allows the crowned conveyor belt 20 to pull packages such as 12 in FIG. 1 to slide along the tops of the slider beds 18, 19.

As may be understood, a package preferably does not touch both of the slider beds at the same time as it is being drawn along by the crowned conveyor belt 20; instead, the package preferably tilts to one side as it is positioned atop the crowned conveyor belt 20, such that only one slider bed is being contacted and is providing support.

The Center Belt

Figure 5:
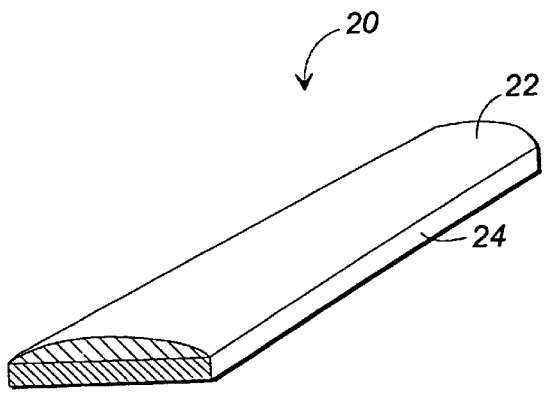
FIG. 5 is an isolated view of a portion of the crowned belt 20 according to the prevent invention. It should be understood that this substantially straight portion is part of an endless belt which can be driven and guided by pulleys or other means such as known in the art.

FIG. 5 is an isolated, partially cut-away, pictorial view of the endless crowned conveyor belt 20. The crowned conveyor belt 20 includes a lower structural belt portion 24 and an upper deformable crowned belt portion 22. The term "crowned" is meant to mean that packages, when placed atop the crowned belt and resting on either of the slider beds, do not touch a corner defined by the belt; instead the curved surface of the crowned belt allows it to "roll" along the lower surface of the package. For example, if a package was placed upon the crowned belt such that it only touched one slider bed, and a person pushed down on the opposite, non-contacting, side of the package, the crowned surface would laterally "roll" in contact with the under surface of the package as the package tilted to contact the "other" side.

With the "crowned" nature of the belt, no corner would be encountered by the package under surface.

When in place, the upper deformable belt portion 22 of the crowned conveyor belt 20 fits within an associated guide channel 26 and has a top portion extending above the plane defined by the top surfaces of the slider beds 18.

Figure 6:
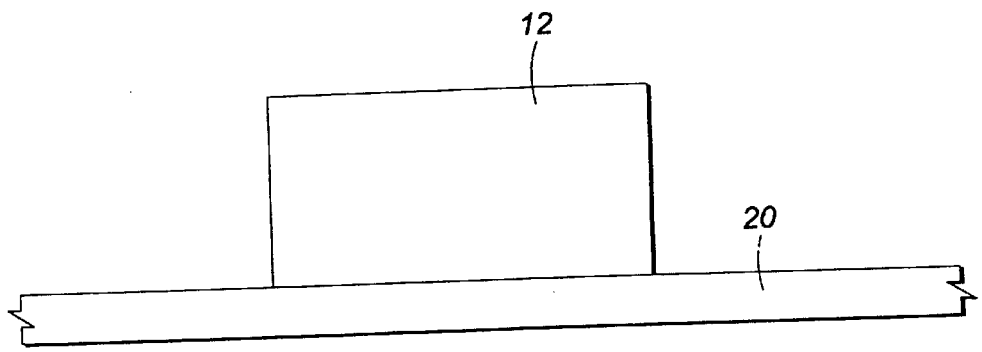
FIG. 6 is a side elevational view illustrating a package 12 atop the crowned belt 20, showing the deformation provided thereby.

Referring momentarily also to FIG. 6, the deformable belt portion 22 of the crowned conveyor belt 20 deforms under the weight of a parcel 12 such that portions of the deformable belt portion adjacent to the parcel 12 extend slightly higher than the bottom surface of the parcel 12 to grip the parcel 12. This provides a "gripping" feature which is believed to be advantageous.

The deformable belt 20 is endless in the preferred embodiment, although the portion shown in the figures is substantially straight, and extends between two sets of static slider beds 18 and the discharge station 30. The belt 20 is driven by means known in the art.

The Belt Guide Channel

The belt guide channel is elongate and defines an upwardly-directed cavity configured to accept a length of the crowned conveyor belt 20, such that the upper crowned surface extends upwardly therefrom.

The Discharge Station 30 Generally

FIG. 1 is a top plan view of the discharge station as used in conjunction with the conveyor and the slider beds. The discharge station 30 includes a package tilting assembly 31 and a pair of withdrawal rollers 40.

The tilting assembly 31 includes a pivoting fork assembly 32, a two-way actuator 60, and a return spring 62.

The pivoting fork assembly 32 includes a fork member 33, a pair of parallel support rods 35, four idler roller stub shafts 36, and eight idler rollers 34. It may be understood that more than one tiling assembly may be used in conjunction with one The Withdrawal Rollers The withdrawal rollers are positioned outside of the package tilting assembly 31. These withdrawal rollers 40 are also positioned at the inlets to the discharge chutes 50, 51 and aid in the transfer of parcels 12 onto the discharge chutes 50, 51.

Figure 2:
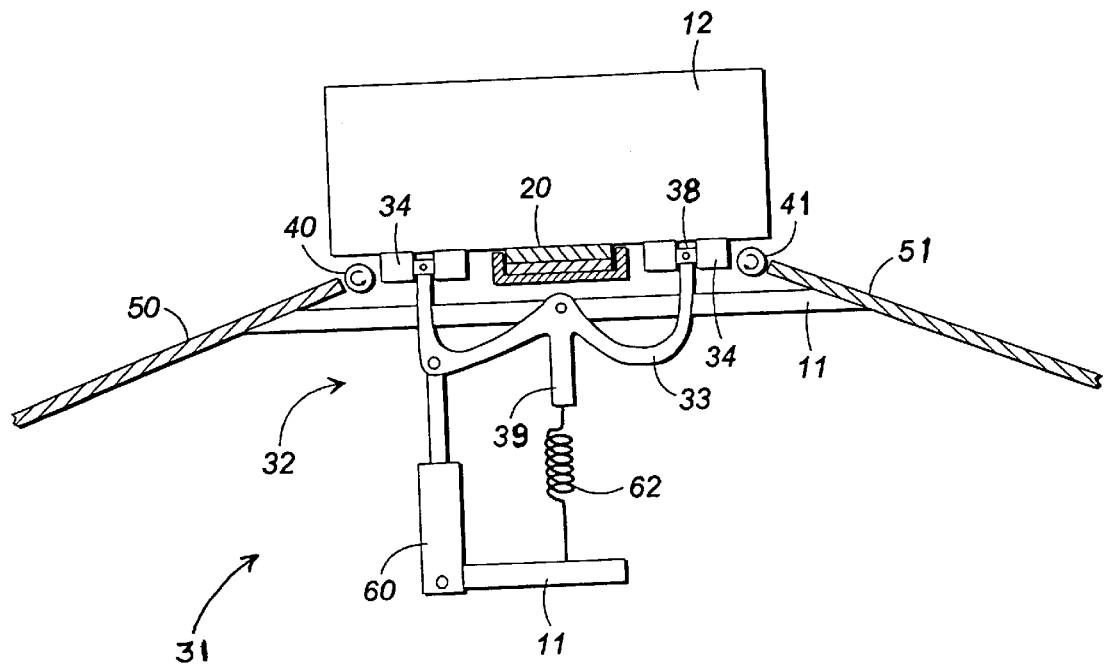
FIG. 2 is a downstream end, partial cross-sectional view of the apparatus 10 of FIG. 1, showing the belt 20 in cross-section. This view shows the pivoting fork assembly 32 in its "neutral" position, which would allow packages to move thereby without being discharged.
Figure 3:
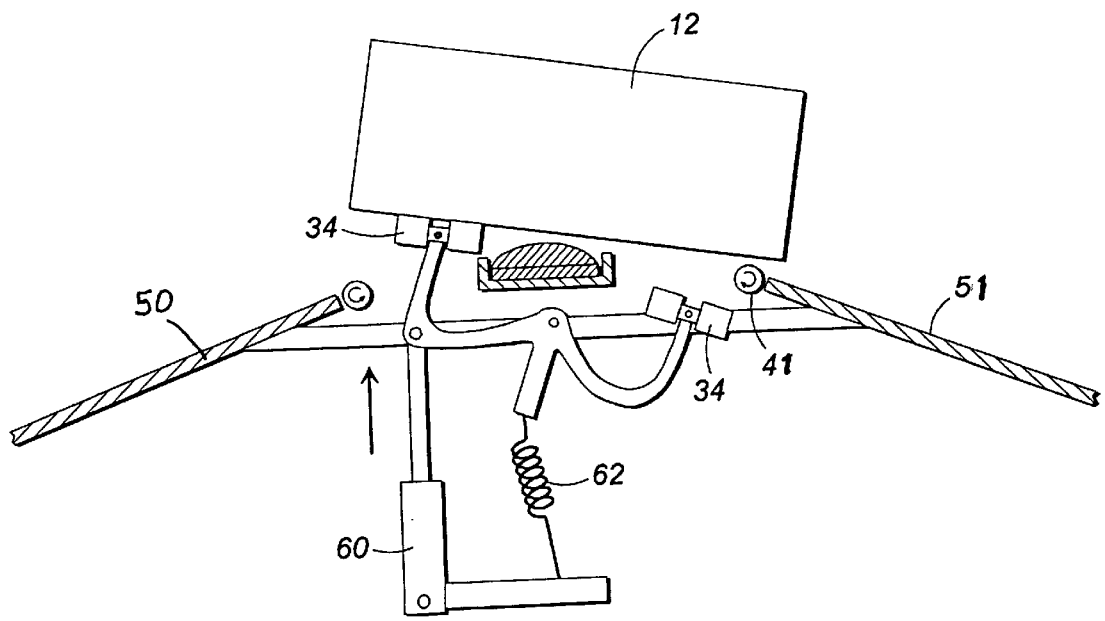
FIG. 3 is a view similar to that of FIG. 2, except that the pivoting fork assembly has been pivoted to one side, the "right" side as the figure is viewed, to a "first" pivoted position.
Figure 4:
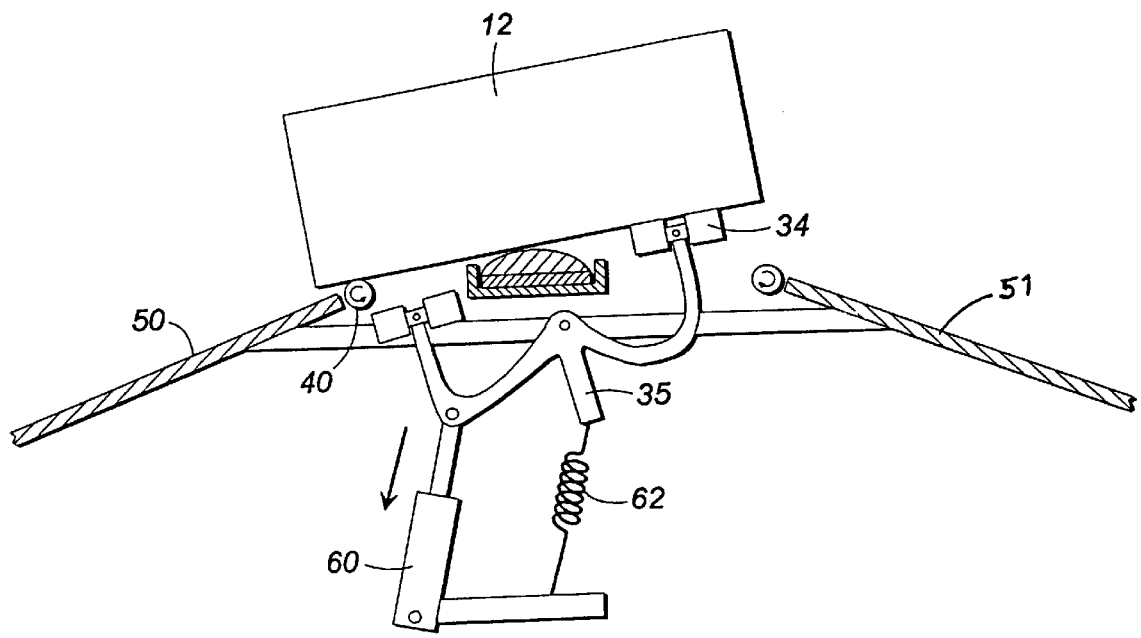
FIG. 4 is a view similar to that of FIG. 3, except the pivoting fork assembly has been pivoted to its "left" side as the figure is viewed, to a "second" pivoted position.

In the preferred embodiment, the withdrawal rollers 40 are rotatably mounted along axes which are substantially horizontal and coparallel with the travel axis of the crowned conveyor belt 20. The withdrawal rollers 40, 41 can be driven to enhance the transfer of parcels 12 onto the discharge chutes 50, 51. As depicted in FIG. 2, the withdrawal rollers 40, 41 do not make contact with the parcels 12 when the fork 33 is not pivoted to a discharge position. As depicted in FIG. 3 and 4, the withdrawal rollers 40, 41 do make contact with the parcels 12 when the fork 33 is pivoted to a discharge position, which results in withdrawal of the package by the withdrawal roller.

The Package Tilting Assembly

The package tilting assembly 31 includes a pivoting fork assembly 32, a two-way actuator 60, and a return spring 62.

Generally described, the package tilting assembly 31 is configured to tilt packages which are atop the crowned conveyor belt 20 such that the packages can engage and be withdrawn by the withdrawal rollers 40.

The pivoting fork assembly 32 includes a fork member 33, a pair of parallel support rods 35, four idler roller stub shafts 36, and eight idler rollers 34.

The fork member 33 is generally W-shaped, and is pivotably mounted relative to the frame 11 of the apparatus 10 of the present invention about an axis which is generally parallel to the primary conveying axis. The fork member 33 includes a pair of upwardly-directed tines, and an elongate, downwardly-directed spring mounting member 39.

Fixed at the end of each of the tines is one of two corresponding parallel support rods 35, which have longitudinal axes which are substantially coparallel with the primary conveying axis. The ends of the tines 37 attach to central portions of the parallel support rods as shown in the figures, such that the leading and trailing ends of the parallel support rods 35 are oriented respectively upstream and downstream relative to the conveying direction.

Attached to the leading and trailing ends of the parallel support rods 35 are the shorter stub shafts 36, which are oriented such that their longitudinal axes of parallel to each other and perpendicular relative to the conveying axis. Two idler rollers 34 are rotatably mounted to each stub shaft 36, one roller 34 at each end. The idler rollers 34 rotate about the longitudinal axis of their associated stub shafts.

As discussed in detail later, the pivoting fork assembly performs an ejecting function. For this reason, the pivoting fork assembly could be thought of as having two synchronized "ejection members", each of which includes one tine 37 of the fork member, one parallel support rod 35, two idler roller stub shafts, and four idler rollers 34.

Also as discussed in detail later, when in their "neutral" locations as shown in FIG. 2, the idler rollers are positioned such that their uppermost surfaces are in the same plane as the top surfaces of the slider beds 18. However, when the pivoting fork assembly 32 is indexed to either side as shown in either of the configurations shown in FIGS. 3 or 4, some of the idler rollers go above this plane and some go below the plane. The idler roller stub shafts 36 are pivotably attached relative to the parallel support rods 35, to allow the above-the-plane rollers 34 to remain in contact with the underside of the packages 12. Again as shown in FIGS. 3 and 4, when the pivoting fork assembly 32 is indexed to either side, the stub shafts pivot relative to the fork member to accommodate the relative pivoting of the package as it is lifted.

As shown in FIGS. 2, 3, and 4, a linear force actuator 60 has one end connected to one of the two tines 37 of the fork member 33, and its other end to the frame 11 of the apparatus. This is a double-acting actuator 60, and is configured to cause the pivoting of the pivoting fork assembly 32 from its "neutral" position shown in FIG. 2 to either of its "first" or "second" pivoted positions shown respectively in FIGS. 3 or 4. By expanding, the linear force actuator 60 causes the pivoting fork assembly 32 to pivot from its "neutral" position to its first pivoted position shown in FIG. 3. By contracting, the linear force actuator 60 causes the pivoting fork assembly 32 to pivot from its "neutral" position to its second pivoted position shown in FIG. 4.

The actuator 32 is a dual-action pneumatic cylinder, although other motive means may be provided without departing from the spirit and scope of the present invention.

As shown in FIGS. 2, 3, and 4, the fork member 33 includes an elongate spring mounting member 39 which extends downwardly from the pivot point location of the fork member 33. A tensile return spring 62 has one end attached to the lower end of the spring mounting member 39, and its other end attached to the frame of the apparatus 10. Therefore it may be seen that the pivoting fork assembly 32 is biased into its neutral position by the return spring 62, that seeks to maintain the top surfaces of the idler rollers 18 even with the plane defined by the upper surfaces of the static slider beds 18 (FIGS. 1 and 2).

Operation

Operation is as follows. A package 12 is placed on the crowned conveyor belt 20 at an upstream location. The package is drawn towards the discharge station 30. At this point, the parcels (which may also be referred to as "packages" 12) can take three different routes once they reach the discharge stations. They may be allowed to pass the discharge station 30 and continue to be conveyed by the crowned conveyor belt 20, or they can be selectively discharged off of the crowned conveyor belt and into discharge chutes 50 located to either side of the substantially straight path of the crowned conveyor belt 20. If they are to be allowed to pass the discharge station, the actuator 60 is simply not energized, and the package slides off the first, "upstream" set of slider beds 18, onto the idler rollers 34, and then off the idler rollers onto the second, "downstream" set of slider beds 18.

However, if discharge is desired, the actuator 60 will have to be energized. Actuation of the actuator to index the package tilting assembly 31 from its neutral position in FIG. 2 to its "left discharge" (as viewed) configuration in FIG. 4 is discussed as an example, although the "right discharge".

Referring now to FIGS. 2 and 4, upon retraction of the actuator 60, the pivoting fork assembly 32 of the package tilting assembly 31 moves from its "neutral" position shown in FIG. 2 to either its pivoted positions shown in FIGS. 4. By retracting, the linear force actuator 60 causes the left side idler rollers 34 to be moved downwardly and away from contact with the bottom of the package 12. Conversely, the right side rollers are urged upwardly and slightly to the left, lifting the right side of the package such that it tilts to its left and eventually contacts the left side powered withdrawal roller 40. It may be understood that the downward movement of the left side idler rollers 34 "clears the way" for such tilting, which would not be possible if the left side idler rollers 34 had not moved. This is an important feature of the invention.

As noted above, the idler roller stub shafts 36 which support the idler rollers are pivotably attached relative to the parallel support rods 35, to allow the above-the-plane rollers 34 to remain in contact with the underside of the packages 12. Again referencing FIG. 4, when the pivoting fork assembly 32 is indexed as shown, the stub shafts pivot relative to the fork member to accommodate the relative pivoting of the package as it is lifted.

Timing

The timing of the apparatus may be varied as known in the art to provide suitable discharge characteristics. However, for a belt speed of 500 FPM (feet per minute), it is believed that a fork ejection cycle would be in the range of 1 second.

Construction

The deformable belt portion 22 of the crowned conveyor belt 20 is preferably made of soft urethane, which slightly deforms during support of typical packages.

The lower structural belt portion 24 of the crowned conveyor belt 20 is preferably made of conventional belt material.

The apparatus is configured to accept and manipulate packages being 2 to 3 feet wide, and 2 to 5 feet long.

It should be understood that various alternates are possible without departing from the spirit and scope of the present invention. For example, instead of individual rollers, belted rollers could be used.

Conclusion

While this invention has been described in specific detail with reference to the disclosed embodiments, it will be understood that many variations and modifications may be effected within the spirit and scope of the invention as described in the appended claims.

I claim:

1. A conveying apparatus for conveying a flatbottomed package thereon, said conveying apparatus comprising:

a belt having an deformable surface defined by a soft urethane crowned portion, said crowned portion deforming under the weight of said package when placed thereon, said deformation being from its undeformed relaxed crowned shape to a deformed shape; and a substantially horizontal slider bed positioned adjacent said deformable belt, said slider belt including a substantially horizontal planar portion lying in a plane which intersects or lies below said crowned portion of said belt when in said relaxed crowned shape, said soft urethane crowned portion and said deformable belt and said slider bed configured to combine to support the weight of said package, and said cushioned belt configured to urge said package along said conveying axis while a part of said package is being supported by said slider bed.

2. The conveyer apparatus as claimed in claim 1, wherein said belt is a composite two layer belt with an upper layer comprised of said soft urethane, and a lower layer comprising of structural belt material.

3. The conveyor as claimed in claim 1, wherein said deformable belt is configured to deform upon placement of a package thereon, such that two shoulders are provided on the belt which bias against the leading and trailing walls of said package.

4. The conveyor as claimed in claim 1, wherein said belt has a crowned configuration as viewed along its transverse cross-section.

5. A conveying apparatus for conveying a flat bottomed package thereon, comprising:

a two-layer crowned deformable belt including an upper deformable crowned portion and a lower, less deformable, structural portion; and a substantially horizontal slider bed positioned adjacent said deformable belt; said belt and said slider bed configured to combine to support the weight of said packages, and said cushioned belt configured to urge said package along said conveying axis.

6. The conveyor as claimed in claim 5, wherein said upper deformable crowned portion belt is composed of soft urethane.

7. A conveying apparatus for conveying a flat-bottomed package thereon, said conveying apparatus comprising:

a conveyor belt with a crowned top, said belt including an elongate substantially straight portion, said crowned top deforming under the weight of said package when placed thereon, said deformation being from its undeformed relaxed crowned shape to a deformed shape; and first and second elongate planar support means positioned on opposing sides of said straight portion of said belt and configured to provide support at a common plane, said plane intersecting or lying below said crowned top of said conveyor belt when said package is not positioned thereon, said belt and one of said first and second support means configured to combine to support the weight of said package, and said cushioned belt configured to urge said package along said conveying axis.

8. The conveyor as claimed in claim 7, wherein said first and second support means are first and second substantially planar slider beds.

9. The conveyor as claimed in claim 7, wherein said first and second support means are first and second idler rollers.

10. The conveyor as claimed in claim 7, wherein said conveyor belt is a cushioned belt made of soft urethane.

11. The conveyor as claimed in claim 10, wherein said conveyor belt is a two layer belt, and said cushioning is provided in its upper layer.

12. The conveyor as claimed in claim 7, wherein said belt when deformed by a package defines an engaging shoulder to assist to urge said package along said conveying axis.

13. A conveying apparatus for conveying a package having a substantially planar, downwardly-directed lower surface, said conveying apparatus comprising:

an endless belt having a portion lying along a substantially straight path having a longitudinal path axis, said belt defming an upper surface configured to contact said downwardly-directed lower surface of said package and to transport said package thereon while allowing said package to be tilted laterally thereon from an untilted neutral orientation to a tilted orientation;

an ejection member configured to contact and urge said package such that said package is tilted from said neutral to said tilted orientation; and a withdrawal member positioned below the plane of and spaced from said downwardly-directed lower surface when said package is in said neutral orientation, but also positioned to be in frictional contact with a portion of said downwardly-directed lower surface when said package is in said tilted orientation and still in at least instantaneous contact with said endless belt, said frictional contact being sufficient to allow said withdrawal member to assist in the removal of said package from said belt, such that said package can be contacted and urged by said ejection member moving relatively towards said withdrawal member from said neutral to said tilted orientation and said withdrawal member can assist in the removal of said package from said belt.

14. The conveyor apparatus as claimed in claim 13, wherein said ejection member is at least one conveyor roller.

15. The conveyor apparatus as claimed in claim 14, wherein said roller is an idler roller.

16. The conveyor apparatus as claimed in claim 14, wherein said portion of said lower surface of said package which is contacted by said withdrawal member is a first lower surface portion, and wherein said package extends laterally beyond one side of said endless belt such that a second lower surface portion of said bottom surface is exposed, and wherein said means for tilting contacts said second lower surface portion of said package.

17. The conveyor as claimed in claim 13, wherein said belt has a crowned configuration as viewed along its transverse cross-section.

18. The conveyor apparatus as claimed in claim 13, wherein said withdrawal roller is a powered roller.

19. A conveying apparatus for conveying a package having a substantially planar lower surface, said conveying apparatus comprising:

an endless belt configured to transport a package along a conveying path, said endless belt having a crowned upper surface allowing said package to be tilted laterally atop said crowned surface such that said lower package surface can be in contact with said crowned surface yet can be tilted from a substantially horizontal to an inclined orientation;

a withdrawal member having a frictionally engaging member configured to engage said package only when tilted laterally; and an ejection member for moving relatively towards said withdrawal member and contacting and tilting said package laterally across the longitudinal axis of said belt such that said withdrawal member frictionally engages a portion of said lower surface of said package while said package is at least instantaneously in contact with said endless belt, and tends to remove said package from atop said conveyor.

20. A conveying apparatus for conveying a package having a substantially planar, downwardly-directed lower surface including first and second spaced-apart lower surface portions, said conveying apparatus comprising:

an endless belt having a portion lying along a substantially straight path having a longitudinal path axis, said belt defining an upper surface configured to contact said downwardly-directed lower surface of said package and to transport said package thereon, said belt having a width less than that of said package to allow said package to extend laterally therefrom on both sides of the belt to provide access from below to said lower surface portions of said planar lower surface and to allow said package to be tilted laterally thereon from a neutral orientation to one of two tilted orientations, said orientations being a first and a second tilted orientation;

a first ejection member including at least one conveyor roller mounted to rotate about an axis substantially transverse to the conveying axis, said conveyor roller configured to contact and urge said first lower surface portion of said package such that said package is tilted from said neutral to said first tilted orientation;

a second ejection member including at least one conveyor roller mounted to rotate about an axis substantially transverse to the conveying axis, said conveyor roller configured to contact and urge said second lower surface portion of said package such that said package is tilted from said neutral to said second tilted orientation;

a first withdrawal member positioned below the plane of and spaced from said downwardly-directed lower surface when said package is in said neutral orientation, but also positioned to be in frictional contact with said downwardly-directed lower surface when said package is in said second orientation, said frictional contact being sufficient to allow said withdrawal member to assist in the removal of said package from said belt, a second withdrawal member positioned below the plane of and spaced from said downwardly-directed lower surface when said package is in said neutral orientation, but also positioned to be in frictional contact with said downwardly-directed lower surface when said package is in said second tilted orientation, said frictional contact being sufficient to allow said withdrawal member to assist in the removal of said package from said belt, such that said package can be contacted and urged by said first ejection member from said neutral to said first tilted orientation and said first withdrawal member can assist in the removal of said package from said belt in a first direction, and such that said package can be contacted and urged by said second ejection member from said neutral to said second tilted orientation and said second withdrawal member can assist in the removal of said package from said belt in a second direction.

21. The conveyor apparatus as claimed in claim 20, wherein said first and second ejection members each move upwardly and inwardly toward the center of said belt when contacting said package.

22. The conveyor apparatus as claimed in claim 20, wherein said first and second ejection members are part of a fork assembly, said fork assembly being selectively PivotTable about a pivoting axis below said conveyor belt, such that as said pivoting fork assembly pivots about said pivoting axis from a neutral position to a first pivoted position, said first ejection member contacts said first lower surface portion and causes said package to tilt towards said first tilted position, and such that as said pivoting fork assembly pivots about said same pivoting axis from said neutral position to a second pivoted position, said second ejection member contacts said second lower surface portion and causes said package to tilt towards said second tilted position.

23. The conveyor apparatus as claimed in claim 22, wherein said first and second ejection members each include at least one conveyor roller.

24. A conveying apparatus for conveying a package having a substantially planar, downwardly-directed lower surface including first and second spaced-apart lower surface portions, said conveying apparatus comprising:

an endless belt having a portion lying along a substantially straight path having an upstream and downstream portion both lying along a longitudinal path axis, said belt defining an upper surface configured to contact said downwardly-directed lower surface of said package and to transport said package thereon, said belt having a width less than that of said package to allow said package to extend laterally therefrom to provide access to said lower surface portions of said planar lower surface and to allow said package to be tilted laterally thereon from a neutral position to a first tilted position;

a pair of slider beds on opposite sides of said first portion of said belt, said slider beds each defining a plurality of support portions all lying substantially in a first common plane; and a discharge station having two movable support means each defining a plurality of support portions all lying substantially in a second common plane, said movable support means commonly selectively movable relative to said longitudinal axis of said belt such that said plurality of support portions can be selectively moved from a position in which said first common plane is common to said second common plane to a position in which said first common plane is at an angle to said second common plane.

25. A conveying apparatus for conveying a package having a substantially planar, downwardly-directed lower surface including first and second spaced-apart lower surface portions, said conveying apparatus comprising:

an endless belt having a portion lying along a substantially straight path having a longitudinal path axis, said belt defining an upper surface configured to contact said downwardly-directed lower surface of said package and to transport said package thereon, said belt having a width less than that of said package to allow said package to extend laterally therefrom on both sides of the belt to provide access from below to said lower surface portions of said planar lower surface and to allow said package to be tilted laterally thereon from a neutral orientation to one of two tilted orientations, said orientations being a first and a second tilted orientation;

a first ejection member configured to contact and urge said first lower surface portion of said package such that said package is tilted from said neutral to said first tilted orientation;

a second ejection member configured to contact and urge said second lower surface portion of said package such that said package is tilted from said neutral to said second tilted orientation;

a first withdrawal member positioned below the plane of and spaced from said downwardly-directed lower surface when said package is in said neutral orientation, but also positioned to be in frictional contact with said downwardly-directed lower surface when said package is in said second orientation, said frictional contact being sufficient to allow said withdrawal member to assist in the removal of said package from said belt, a second withdrawal member positioned below the plane of and spaced from said downwardly-directed lower surface when said package is in said neutral orientation, but also positioned to be in frictional contact with said downwardly-directed lower surface when said package is in said second tilted orientation, said frictional contact being sufficient to allow said withdrawal member to assist in the removal of said package from said belt, wherein said first and second ejection members are synchronized in movement such that said first ejection member moves upwardly to tilt the package and said second ejection member moves downwardly away from the package, and vice versa, such that said package can be contacted and urged by said first ejection member from said neutral to said first tilted orientation and said first withdrawal member can assist in the removal of said package from said belt in a first direction, and such that said package can be contacted and urged by said second ejection member from said neutral to said second tilted orientation and said second withdrawal member can assist in the removal of said package from said belt in a second direction.

26. A conveying apparatus for conveying a package having a substantially planar, downwardly-directed lower surface including first and second spaced-apart lower surface portions, said conveying apparatus comprising:

an endless belt having a portion lying along a substantially straight path having a longitudinal path axis, said belt defining an upper surface configured to contact said downwardly-directed lower surface of said package and to transport said package thereon, said belt having a width less than that of said package to allow said package to extend laterally therefrom on both sides of the belt to provide access from below to said lower surface portions of said planar lower surface and to allow said package to be tilted laterally thereon from a neutral orientation to one of two tilted orientations, said orientations being a first and a second tilted orientation;

a first ejection member including at least one conveyor roller mounted to rotate about an axis substantially transverse to the conveying axis, said conveyor roller configured to contact and urge said first lower surface portion of said package such that said package is tilted from said neutral to said first tilted orientation;

a second ejection member including at least one conveyor roller mounted to rotate about an axis substantially transverse to the conveying axis, said conveyor roller configured to contact and urge said second lower surface portion of said package such that said package is tilted from said neutral to said second tilted orientation;

a first withdrawal member positioned below the plane of and spaced from said downwardly-directed lower surface when said package is in said neutral orientation, but also positioned to be in frictional contact with said downwardly-directed lower surface when said package is in said second orientation, said frictional contact being sufficient to allow said withdrawal member to assist in the removal of said package from said belt, a second withdrawal member positioned below the plane of and spaced from said downwardly-directed lower surface when said package is in said neutral orientation, but also positioned to be in frictional contact with said downwardly-directed lower surface when said package is in said second tilted orientation, said frictional contact being sufficient to allow said withdrawal member to assist in the removal of said package from said belt, wherein said first and second ejection members are part of a fork assembly, said fork assembly being selectively pivotable about a pivoting axis below said conveyor belt, such that as said pivoting fork assembly pivots about said pivoting axis from a neutral position to a first pivoted position, said first ejection member contacts said first lower surface portion and causes said package to tilt towards said first tilted position, and such that as said pivoting fork assembly pivots about said same pivoting axis from said neutral position to a second pivoted position, said second ejection member contacts said second lower surface portion and causes said package to tilt towards said second tilted position, such that said package can be contacted and urged by said first ejection member from said neutral to said first tilted orientation and said first withdrawal member can assist in the removal of said package from said belt in a first direction, and such that said package can be contacted and urged by said second ejection member from said neutral to said second tilted orientation and said second withdrawal member can assist in the removal of said package from said belt in a second direction.

27. The conveyor apparatus as claimed in claim 26, wherein said conveyor rollers provide rolling support to said package while said pivoting fork assembly is in said neutral position.

* * * * *